Figure 1:
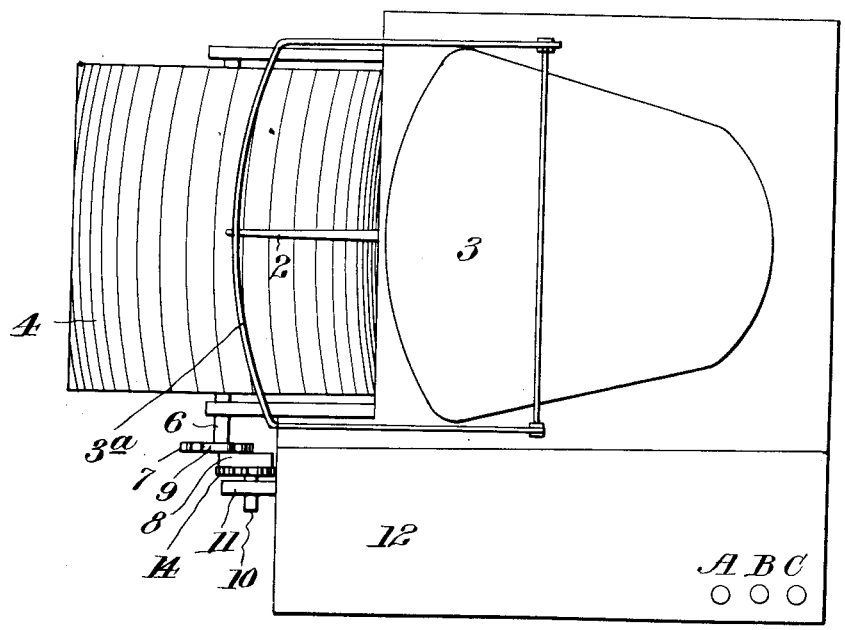

C. B. THWING.
GRAPHIC RECORDER.
APPLICATION FILED AUG. 24, 1912.

1,085,511.

Patented Jan. 27, 1914.

2 SHEETS—SHEET 1.

WITNESSES

INVENTOR
Charles B. Thwing

Attorney

C. B. THWING.
GRAPHIC RECORDER.
APPLICATION FILED AUG. 24, 1912.

1,085,511.

Patented Jan. 27, 1914.
2 SHEETS—SHEET 2.

WITNESSES
C. N. Walker
W. Fries

INVENTOR
Charles B. Thwing
by W. B. Corwin
Attorney

UNITED STATES PATENT OFFICE.

CHARLES B. THWING, OF PHILADELPHIA, PENNSYLVANIA, ASSIGNOR TO THWING INSTRUMENT COMPANY, OF PHILADELPHIA, PENNSYLVANIA, A CORPORATION OF PENNSYLVANIA.

GRAPHIC RECORDER.

1,085,511.  Specification of Letters Patent.  Patented Jan. 27, 1914.

Original application filed August 27, 1911, Serial No. 646,276. Divided and this application filed August 24, 1912. Serial No. 716,823.

*To all whom it may concern:*

Be it known that I, CHARLES B. THWING, a citizen of the United States, residing at Philadelphia, in the county of Philadelphia and State of Pennsylvania, have invented a certain new and useful Improvement in Graphic Recorders, of which the following is a specification.

This application is a division of an application filed by me August 27th, 1911, Serial Number 646,276, on which Patent No. 1,046,680, was granted December 10, 1912.

My invention relates to an improvement in graphic recorders, and it consists in a recorder which will facilitate the making on a single record sheet or chart of a plurality of records in frequent succession from a plurality of sources, these records being repeated so as to give essentially a continuous record of all the sources of energy. For example, if it be desired to record on a single chart the electric current consumed on a plurality of circuits, the several circuits will be automatically switched into the recorder in regular succession, my improvement providing a simple and practical method of making visible on the record chart which portions of the record thereon were made by the current from each of the several electric circuits. In similar manner a number of pipes carrying fluids under pressure could be automatically and successively thrown into connection with a recording pressure gage.

The essential features of an instrument which is to give a graphic record of the variation of any measured quantity with the time consists of a registering element and a surface which receives the record made by the registering element, the latter of which moves in a given direction with the lapse of time, the former remaining in operative recording contact with the recording surface varying lengths of time accordingly as one or another source of energy is turned into the recorder. In such recording instruments, the receiving element, called hereinafter the chart, moves over equal intervals in equal times, sometimes continuously and sometimes by short steps with intervening intervals of rest. The recording element, hereinafter called the pen, may be depressed or otherwise caused to record on the chart at intervals, or it may be caused to remain continuously in contact with the chart. My present invention relates to the latter form in which the recording instrument is constantly held in recording engagement with the chart.

I shall now describe my invention so that others skilled in the art to which it appertains may manufacture and use the same, reference being had to the accompanying drawings, forming part of this specification, in which—

Figure 2:
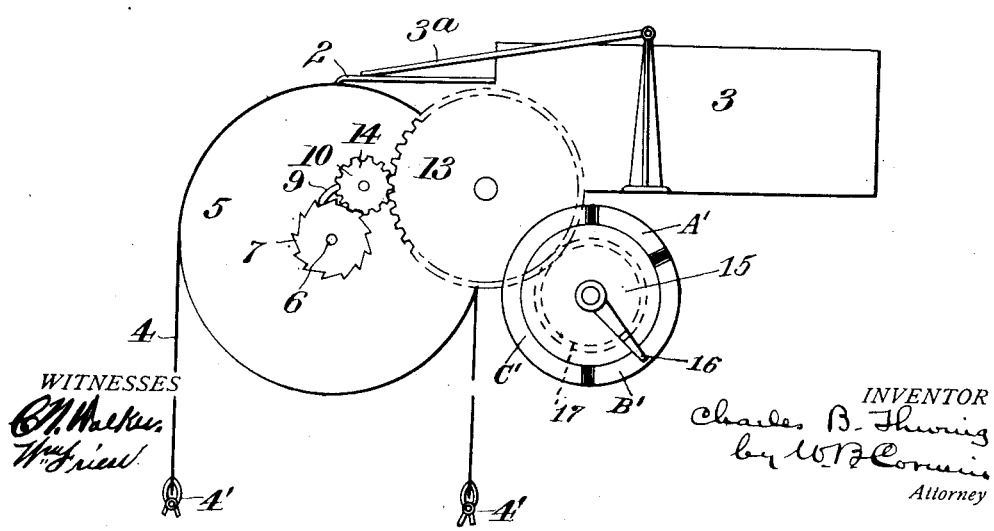
Figure 3:
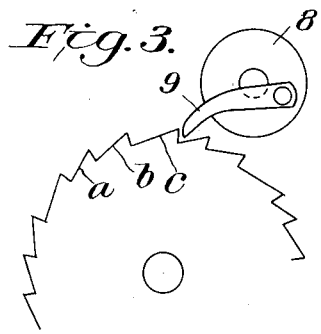
Figure 6:
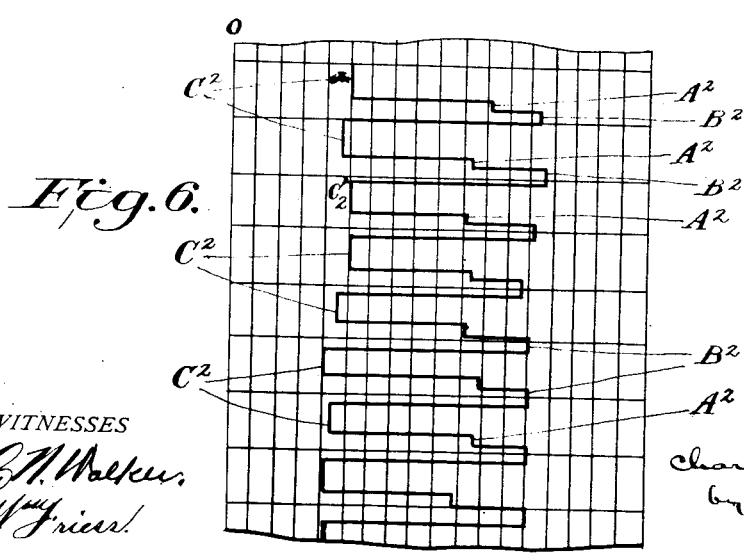

Figure 1 is a top plan view of a recorder embodying my invention. Fig. 2 is a side elevation of the same omitting the clockwork casing for the sake of clearness. Figs. 3 and 3', 4 and 4', and 5 and 5', are enlarged detail views of the pawl and ratchet mechanism shown in Figs. 1 and 2 which I employ to effect the movement of the chart. Fig. 6 is a portion of a chart showing a record such as would be made by the recorder.

Like symbols of reference indicate like parts in the several figures.

Figure 4:
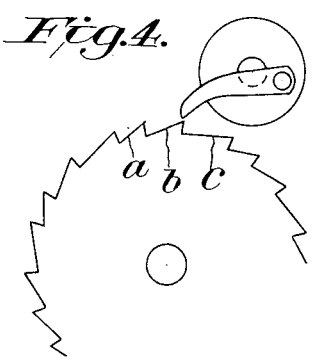
Figure 5:
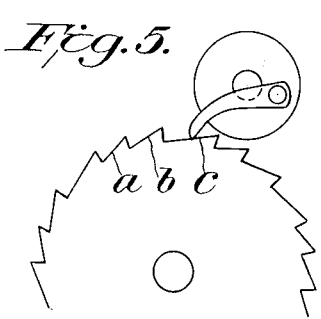
Figure 3:
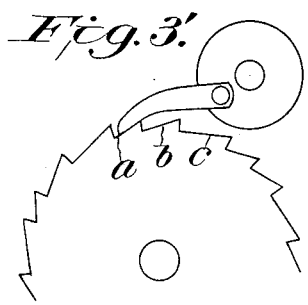
Figure 4:
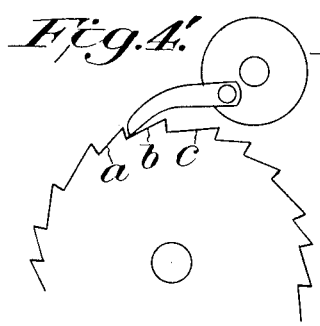
Figure 5:
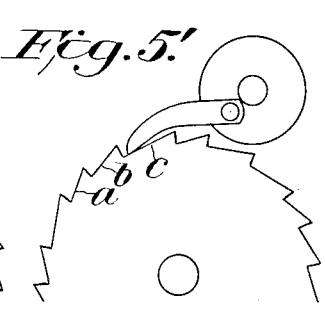

In the drawings, 2 indicates the needle or pen of any ordinary form of galvanometer 3, which needle or pen when the instrument is in use is kept in recording contact with the chart 4 by the yoke $3^a$, but is free to move from side to side of the chart in accordance with the fluctuations of the current actuating the galvanometer. The chart 4 is held against the drum 5 and compelled to travel therewith by two counterbalancing weights 4'. The drum 5 is mounted on a shaft 6, on the outer end of which is a ratchet wheel 7 of peculiar design having teeth $a$, $b$, $c$, unequally spaced, illustrated in detail in Figs. 3 to 5'. Mounted on a disk 8, is a pawl 9, engaging and adapted to move the ratchet wheel, and thus to rotate the drum 5. The disk 8 is fixed on a shaft 10, which in turn is mounted in a bracket 11 extending from the casing 12 of a clock-work mechanism. A wheel 13 of the clock-work mechanism is adapted to engage a wheel 14 on the shaft 10 of the disk 8, and thus to rotate or move said disk constantly at any desired or predetermined speed. While the movement of the pawl disk 8 is always constant, the movement of the ratchet wheel 7 actuated by the pawl 9 is not constant but irregular, due to its unequally spaced teeth $a$, $b$, $c$. By referring to Figs. 3 and 3', it will be seen that the distance moved forward by the ratchet wheel is nearly equal to the full length of the stroke of the pawl, while in Figs. 4 and 4' the pawl moves idly for about two-thirds of its forward stroke and moves the drum 5 for about one-third of its stroke. In Figs. 5 and 5' the pawl moves idly for about one-third of its forward stroke and effectively for about two-thirds. In this manner the pawl mechanism moving at a constant speed causes the paper on the drum 5, which is actuated by the ratchet wheel 7, to traverse unequal distances in equal times.

The operation of my improved recorder is as follows: The sources of energy, in this particular case electrical, are designated in Fig. 1 as A, B, C. The recorder is so constructed that the relative movements of the pen and chart during the time the different sources of energy, A, B, C, are recording shall be such that the length of the element or graph $A^2$ made by source A shall be different from the graph $B^2$ made by the source B, and the length of the graph $C^2$ made by source C shall be different from both $A^2$ and $B^2$. Thus if it is desired to make three records, distinguishable from each other, of the current in circuits A, B, C, the three circuits will be successively thrown into circuit with the galvanometer by an automatic switch 15, having three stationary contacts A', B', C', connected respectively with the sources of energy A, B, C. Over these contacts A', B', C', travels a movable contact 16 in the galvanometer circuit. The movable contact 16 travels over the contacts A', B', C', at a constant speed, being actuated by the wheel 17 which in turn is moved by the wheel 13 of the clock-work. The construction of the switch 15 and the movable contact 16 is such that the passage of such contact from one stationary contact A', B', or C', to another is instantaneous, preventing the needle of the galvanometer from returning to zero. The pen 2 of the galvanometer 3 being continuously on the chart, the records of the three sources will be made, but due to the irregular movement of the chart caused by the ratchet wheel 7, the records or graphs will take the form illustrated in Fig. 6, where A is shown as making the shortest graph $A^2$, B a longer one $B^a$, and C the longest $C^2$. By connecting the ends of the graphs $A^2$ together by dotted lines, the graph would be complete. The same is true also of the graphs $B^2$ and $C^2$.

The mechanical or automatic means employed in the construction just described for throwing the several sources of energy successively into connection with the recorder may be varied at pleasure, as may also the means used to vary the distance moved by the chart during any given interval of time.

It will be understood that various changes may be made in the mechanical details of my improved recorder without sacrificing any of its advantages or departing from the spirit of the invention.

The advantages of my improvement will be readily apparent to those skilled in the art. My improved recorder is simple in construction, compact, and very reliable in operation.

I claim:—

1. In an automatic multiple recorder, the combination of a chart, means for moving said chart varying distances in equal periods of time, and a recording instrument responding to a plurality of sources of energy and adapted to make a record on said chart at each of the movements of the chart.

2. In an automatic multiple recorder, the combination of a chart, means for moving said chart varying distances in equal periods of time, a galvanometer adapted to be connected to and to respond to a plurality of electrical currents and to make a record on said chart at each of the movements of the chart, and means for automatically throwing said galvanometer into circuit with said electrical circuits.

3. In an automatic multiple recorder, the combination of a chart, means for moving said chart varying distances in equal periods of time, and a recording instrument held constantly against the chart when the recorder is in operation and responding to a plurality of sources of energy and adapted to make a record on said chart at each of the movements of the chart.

In testimony whereof I have hereunto set my hand.

CHARLES B. THWING.

Witnesses:
 CHAS. SANDER,
 D. C. DRAPER.